Sept. 6, 1960     D. L. BUCHANAN     2,951,640

TEMPERATURE CONTROLLING APPARATUS

Filed Jan. 16, 1957

INVENTOR

David L. Buchanan

BY Wm. R. Glisson

ATTORNEY

United States Patent Office 2,951,640
Patented Sept. 6, 1960

2,951,640

TEMPERATURE CONTROLLING APPARATUS

David L. Buchanan, Whitemarsh, Pa., assignor to The Budd Company, Philadelphia, Pa., a corporation of Pennsylvania Filed Jan. 16, 1957, Ser. No. 634,464

6 Claims. (Cl. 236—1)

This invention relates to temperature controlling apparatus, especially to apparatus for maintaining a constant temperature in an air duct, and has for an object the provision of improvements in this art.

When controlling the temperature of air in a duct it has been the custom to provide several stages or units of heat change producing means to avoid sudden changes from on to off of a single heating or cooling element, such as an electrical heating coil or a refrigerating coil. For this purpose a different thermostat has been used for each of the several heating or cooling units and each thermostat was set to apply or cut off heat or refrigeration at a different temperature. For example, one thermostat might be set to apply 6 kw. at 76° F., another to apply an additional 6 kw. when the temperature dropped to 74° F. and another to apply an additional 12 kw. at 72° F., there being then a total of 24 kw. at and below 72° F., 12 kw. from 72° up to 74° F., 6 kw. from 74° F. up to 76° F., and no heat above 76° F.

Now, the preferred condition is that the temperature be held steadily at a given point, say 72° F.; but the described arrangement did not provide it. This was especially objectionable when the outside air was warm because the highest-set thermostat would quickly be brought into action to give undesirable heat to the duct air. That is, when the outside air is cold a higher inside temperature is desirable, but this is the time when the heating means may not be adequate to attain it; whereas when the outside temperature is high a lower inside temperature is desirable for comfort but this is just the time when the high-set thermostats continue to supply some heat to the air to keep it above the desired basic optimum temperature.

According to the present invention, all of the thermostats are subject to approximately same ambient or heated-space temperature but the apparatus is so designed that they act in succession in both directions of their arrangement as related to the amount of heat (or cooling) which they apply. This results in the application of different amounts of heat at one and the same optimum ambient temperature, depending on the amount of heat required to maintain this optimum temperature.

The invention will best be understood by reference to the accompanying drawings wherein.

Figure 1:
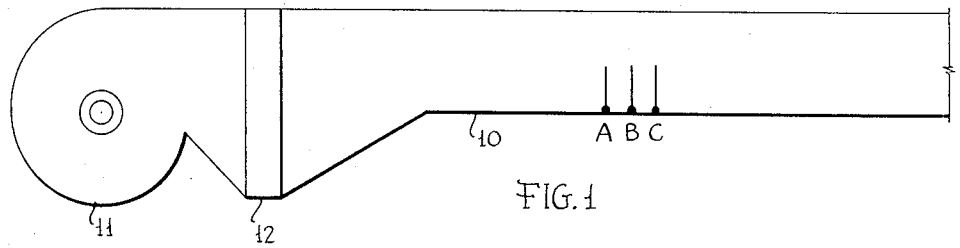
Fig. 1 shows an air supply duct provided with air heating and temperature control means according to the present invention.

As shown in Fig. 1, an air supply duct 10 is provided with an air blower 11 for supplying air, at least partly from outdoors, through a heat change producing unit 12 having several heating coils or elements, to an enclosed occupancy space, such for example, as a railway car. Thermostats A, B and C are arranged in the duct for registering and controlling the temperature of the air by acting on the heating coils.

Figure 2:
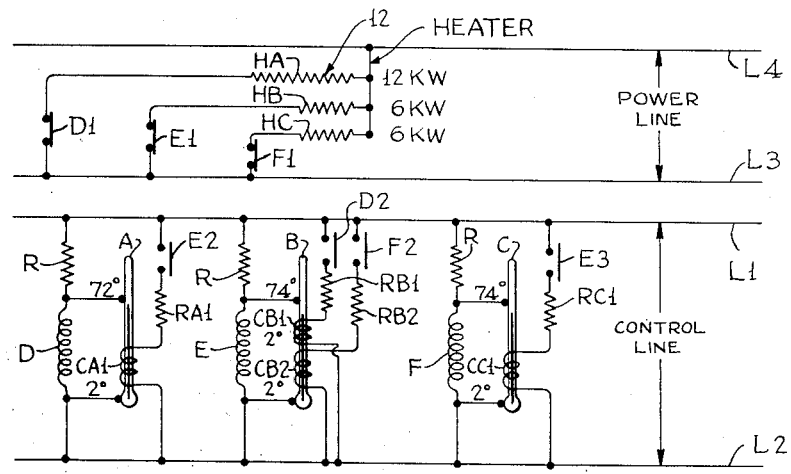
Fig. 2 is a wiring diagram applied to heating.

Fig. 2 shows these thermostats A, B and C arranged in a control circuit between control lines L1 and L2. Specifically for simplicity of illustration the thermostats are shown as mercury column thermometers with a base electrode and a column electrode set at some predetermined point or temperature. The electrodes are in circuit in parallel with a relay coil which is in a shunt line between the main control lines L1 and L2. A resistance R is placed in the shunt line to limit the voltage on the coil and thermostat to avoid damage to them and prevent sparking.

Thermostat A has its mercury column arranged in parallel with a relay coil D, the coil being energized when the thermostat registers less than the temperature for which its upper electrode is set, here 72° F., and being shunted out and de-energized when the thermostat registers 72° F. Relay coil D controls a normally open (dead circuit) switch D1 which is closed when the coil is energized (below 72° F. in the setting given) to apply current to a heating coil HA in a power circuit between power lines L3 and L4. The coil D, of course, could be in series with the mercury column instead of in shunt or parallel, as shown, in which case the switch operation would be opposite.

Thermostat B has its mercury column arranged in parallel with a relay coil E, the coil being energized when the thermostat registers less than the temperature for which its upper electrode is set, here 74° F., and being shunted out and de-energized when the thermostat registers 74° F. Relay coil E controls a normally open switch E1 which is closed when the coil is energized (below 74° F. in the setting given) to apply current to a heating coil HB in the power circuit.

Thermostat C has its mercury column arranged in parallel with a relay coil F, the coil being energized when the thermostat registers less than the temperature for which its upper electrode is set, here 74° F., and being shunted out and de-energized when the thermostat registers 74° F. Relay coil F controls a normally open switch F1 which is closed when the coil is energized (below 74° F. in the setting given) to apply current to a heating coil HC in the power circuit.

Relay coil D for thermostat A, in addition to controlling switch D1 for heating coil HA, also controls a normally closed (dead circuit) switch D2 of a heating unit for thermostat B. The heating unit includes a heating element or coil CB1 and a calibrated resistance RB1 which causes heat to be applied through the heating coil CB1 to the thermostat to raise the effective control point of its mercury column by a predetermined amount, say 2° F., so that, instead of making contact at the nominal or designated point of 74° F. at which the air ambient alone would cause it to act, it will tend to act at 72° F. ambient.

Relay coil E for thermostat B, in addition to controlling switch E1 for heating coil HB, also controls a normally closed switch E2 for a heating unit for thermostat A this heating unit including a heating coil CA1 and a calibrated resistance RA1 (set, say, for 2° F., as before). Thermostat A, when thus heated, will tend to close contact at 70° F. ambient instead of its nominal 72° F. ambient. Coil E also controls a normally closed switch E3 for a heating unit for thermostat C, this heating unit including a heating coil CC1 and a calibrated resistance RC1 (set, say at 2° F., as before). Thermostat C, when thus heated, will tend to close contact at 72° F. ambient instead of its nominal 74° F. ambient.

Relay coil F for thermostat C, in addition to controlling switch F1 for heating coil HC, also controls a normally closed switch F2 for a heating unit for thermostat B, this heating unit including a heating coil CB2 and a calibrated resistance RB2 (set, say, for 2° F., as before). Thermostat B, when thus heated, will tend to close contact at 72° F. ambient instead of its nominal 74° F. ambient.

In operation, starting when the car is cold, say at 50° F., all thermostats will register 50° F. which is below their mercury contacts. The power and control lines are energized and, since all of the relay coils D, E and F are energized and switches D1, E1 and F1 closed, all of the heating elements HA, HB and HC will be energized. If, say, heating element HA is a 12 kw. heater and each of heating elements HB and HC is a 6 kw. heater, then there will be a total of 24 kw. of heat applied to the air being blown through the duct heating unit.

This heats the car interiorly and raises its prevailing or ambient temperature. Since the air circulated through the duct contains a large percentage of recirculated air the thermostats in the duct at a distance from the heating unit will serve satisfactorily to control the ambient of the car. Thermostat A, being arranged to act at 72° F., both nominal and actual, will close its contact first and short out coil D. This will open switch D1 and cut out heater HA, leaving heaters HB and HC still active with 12 kw. of heat together.

De-energization of relay coil D also closes switch D2 and heats thermostat B so it now tends to act at 72° F. ambient instead of 74° F. That is, the mercury column of B starts to rise to the 74° F. setting due to the air temperature plus the bulb heating.

If the 12 kw. of heating now applied is not sufficient to maintain the duct air at 72° F., taking into account the proportion of cold outside air which is drawn in and mixed with the larger proportion of recirculated air passed through the duct heater, the duct air temperature will drop and thermostat A will open contact and cause the heater HA to be re-applied and will also cause the heat to be taken off the bulb of thermostat B.

However, if the 12 kw. of heat is sufficient or in excess of that needed to maintain the duct air at 72° F., the mercury in thermostat B will continue to rise until it reaches 74° F. where it will make contact and de-energize relay E, this opening switch E1 to drop out the heating coil HB and closing switches E2 and E3 to add two degrees of heat to the thermostats A and C respectively.

The application of heat to thermostat A will keep it above 72° F. to insure that the heating coil HA will not be re-applied until thermostat B has dropped below 74° F. (72° F. ambient plus 2° F. bulb heat).

The application of heat to thermostat C will cause it to tend to rise to 74° F. and, in like manner as for thermostat B before, if the remaining heat of 6 kw. is not adequate to cause thermostat C to register 74° F. thermostat B will drop below its 74° F. setting and 6 kw. more heat will be applied. However, if the 6 kw. of heat is sufficient or in excess of that needed to maintain the duct air at 72° F., the mercury in thermostat C will continue to rise until it reaches 74° F. where it will make contact and de-energize relay F, this opening switch F1 to drop out the heating coil HC and closing switch F2 to add two degrees of heat to the thermostat B.

The application of heat to thermostat B will keep it above 74° F. (ambient 72° F. plus 2° F. applied by heater CB1 from thermostat A plus 2° F. applied by heater CB2) to insure that the heating coil HB will not be re-applied until thermostat C has dropped below 74° F. (72° F. ambient plus 2° F. bulb heat).

If the outside temperature falls and more heat is needed, this arrangement provides that only one unit of heat will be added at a time, starting with thermostat C which reapplies 6 kw. but holds off thermostats B and A if this is adequate; then, if not adequate, allowing thermostat B to reapply 6 kw. and hold off thermostat A if the heat is adequate without the action of A; then, if not adequate, allowing thermostat A to re-apply its 12 kw. of heat.

While only three thermostats and three associated heat change producing units are described it will be obvious that there may be as many separate thermostats and heat change producing units as desired by expanding the system upon the principles disclosed, each thermostat adding heat to the thermostat next above it and to the thermostat next below it. This provides smooth modulation at the temperature selected and makes the most effective use of the heat change producing energy.

Also, while mercury column thermostats are shown herein for simplicity, it is possible to use other forms of thermostats, types of which are well known.

Figure 3:
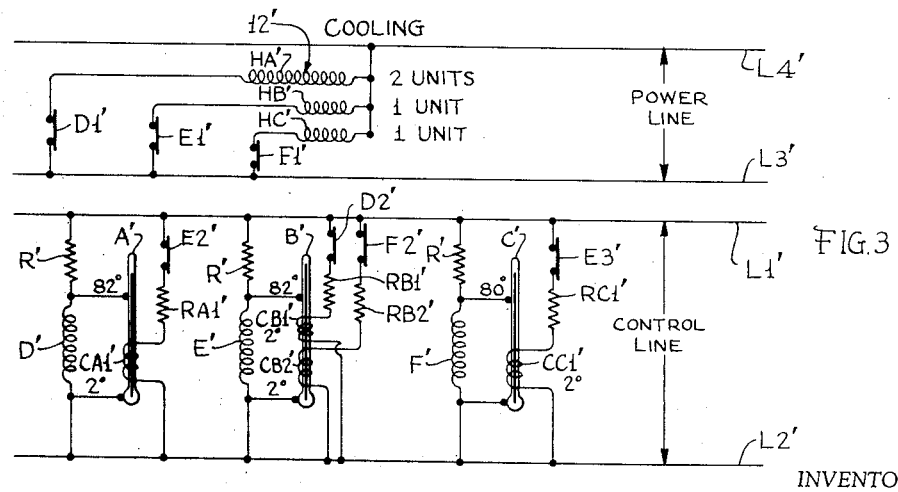
Fig. 3 is a similar diagram applied to cooling.

The same circuit arrangement can be used to control air conditioning instead of heating, it being only necessary to take into account the difference in direction of the thermal changes. Fig. 3 shows the circuit for cooling, all elements being referred to by the same reference characters with a prime (') added.

For example, cooling units HA', HB', HC' are used in place of the heating units HA, HB and HC. These may have a relationship of 2, 1 and 1, as before. The contacts for thermostats A', B' and C' may be set for 82° F., 82° F. and 80° F. respectively. It can be assumed that the prevailing temperature is well above 80° F. and that the contacts of all thermostats are closed. Switches D1', E1' and F1' are closed when their coils D', E' and F' are shorted out by the mercury columns, instead of the reverse for heating. Switches D2', E2', E3' and F2' are also closed when their coils are shorted out, just as for heating; however, since the coils D', E' and F' are normally shorted out, as stated above, these switches are normally closed to apply heat to the thermostats at CA1', CB1', CB2' and CC1'.

Thermostat A' will then act at its setting of 82° F. when the air temperature is 80° F., the heater CA1' holding two degrees of heat on the thermostat.

Thermostat B' will act at its setting of 82° F. but at 80° F. air temperature its mercury column will stand at 80° F. due to the four degrees of heat supplied by its heaters CB1' and CB2'.

Thermostat C' will act at its setting of 80° F. but at 80° F. air temperature its mercury column will stand at 82° F. due to the two degrees of heat supplied by its heater CC1'.

In operation, starting when the car is hot, say at 85° F., all thermostats will register above their setting points or contact, 82° F., 82° F. and 80° F. respectively. Cooling is then started, all cooling coils HA', HB', and HC' being active.

When the air temperature in the duct is at or just below 80° F., thermostat A' will act by breaking contact to take off the short and energize relay coil D'. This will open switch D1' to cut out cooling coil HA' and will also open switch D2' to take two degrees of heating off thermostat B'.

The mercury column of thermostat B' will begin to fall and approach the acting point of 82° F. and if the remaining active cooling coils HB' and HC' are adequate the contact of B' will be broken. This will energize coil E' to open switches E1' E2' and E3'. The opening of E1' will cut out the cooling coil HB'; the opening of switch E2' will cut out the heater of thermostat A' and insure that it cannot act again ahead of thermostat B'; and the opening of switch E3' will cut out the heater of thermostat C' so it will act at its 80° setting point.

Assuming that the single cooling coil HC', still held in by thermostat C', is adequate to hold the temperature down below 80° F., the thermostat C' will break its contact and energize relay coil F'. This will open switches F1' and F2'. The opening of switch F1' will cut out the last cooling coil HC'; and the opening of switch F2' will cut out the heater of thermostat B' and insure that it will not act again ahead of thermostat C′.

If the outside air temperature rises the thermostats cut in cooling coils in the reverse order as required, the last series of thermostats holding off the next preceding thermostat until its cooling element is needed.

It is thus seen that the invention provides a simple, convenient and dependable system for controlling a plurality of thermal change producing elements so as to hold a space temperature very closely to a selected set point without wide fluctuations and without waste of heat change producing energy.

While certain embodiments of the invention have been disclosed specifically for purposes of illustration it is to be understood that there may be various embodiments and modifications within the general scope of the invention.

What is claimed is:

1. A system for controlling the ambient temperature of an environment, which system includes a first, a last, and at least one intermediate subsystem in an ordered sequence, each subsystem comprising a heat change producing unit exchanging heat energy with said environment when actuated, a thermally responsive actuator means actuating said unit in response to a variation of said ambient temperature past a respective ambient response temperature of said actuator means, and an activatable bias means altering in a first direction when activated the ambient response temperature of said actuator means; the bias means of any one subsystem being coupled with and activated by the actuator means of any other next preceding and next succeeding subsystem of said sequence upon variation in the direction opposite to said first direction of the ambient temperature past the ambient response temperature of the last mentioned actuator means.

2. The system of claim 1 wherein said actuator means comprises a circuit including an actuating coil and an alterable-response-temperature thermostatic switch, and wherein said activatable bias means is an electric heater.

3. The system of claim 1 wherein the heat change producing unit of each subsystem is a heating unit, said variation is from a higher to a lower temperature, and said activatable bias means when activated decreases said ambient response temperature.

4. The system of claim 3 wherein said actuator means comprises a circuit including an actuating coil and an alterable-response-temperature thermostatic switch, and wherein said activatable bias means is an electric heater.

5. The system of claim 1 wherein the heat change producing unit of each subsystem is a cooling unit, said variation is from a lower to a higher temperature, and said activatable bias means when activated decreases said ambient response temperature.

6. The system of claim 5 wherein said actuator means comprises a circuit including an actuating coil and an alterable-response-temperature thermostatic switch, and wherein said activatable bias means is an electric heater.

References Cited in the file of this patent

UNITED STATES PATENTS

| | | |
|---|---|---|
| 2,328,472 | Lehane | Aug. 31, 1943 |
| 2,451,566 | Lehane | Oct. 19, 1948 |
| 2,522,285 | Lehane | Sept. 12, 1950 |